(12) United States Patent
Balasubramanian (10) Patent No.: US 9,396,249 B1
(45) Date of Patent: Jul. 19, 2016

(54) METHODS AND SYSTEMS FOR ENCODING PARENT-CHILD MAP TILE RELATIONSHIPS

(71) Applicant: Amazon Technologies, Inc., Reno, NV (US)

(72) Inventor: Rajkumar Balasubramanian, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 298 days.

(21) Appl. No.: 13/921,837

(22) Filed: Jun. 19, 2013

(51) Int. Cl.
*G06F 17/30* (2006.01)

(52) U.S. Cl.
CPC ................ *G06F 17/30595* (2013.01)

(58) Field of Classification Search
CPC ............ G06F 17/30; G06F 17/30595
USPC ........................................................ 707/736
See application file for complete search history.

(56) References Cited

U.S. PATENT DOCUMENTS

| | | | | |
|---|---|---|---|---|
| 4,972,319 | A * | 11/1990 | Delorme ................. | 340/990 |
| 6,788,695 | B1 * | 9/2004 | Nagasawa ................ | 370/408 |
| 7,519,603 | B2 * | 4/2009 | Parker | |
| 7,725,529 | B2 | 5/2010 | Yang et al. .............. | 709/203 |
| 8,650,220 | B2 * | 2/2014 | Rohlf et al. ............. | 707/797 |
| 2001/0039487 | A1 * | 11/2001 | Hammersley et al. ...... | 703/2 |
| 2004/0024779 | A1 * | 2/2004 | Perry et al. ............ | 707/104.1 |
| 2008/0154876 | A1 * | 6/2008 | Hao ....................... | 707/5 |
| 2009/0303251 | A1 | 12/2009 | Balogh et al. .......... | 345/632 |
| 2011/0055290 | A1 * | 3/2011 | Li et al. ................ | 707/807 |
| 2011/0316854 | A1 * | 12/2011 | Vandrovec .............. | 345/420 |
| 2012/0320073 | A1 * | 12/2012 | Mason .................... | 345/581 |
| 2013/0035853 | A1 | 2/2013 | Stout et al. ........... | 701/438 |
| 2013/0328941 | A1 * | 12/2013 | Carbonneau et al. ..... | 345/667 |
| 2015/0078443 | A1 * | 3/2015 | Kolesnikov ............. | 375/240.03 |

* cited by examiner

*Primary Examiner* — Rehana Perveen
*Assistant Examiner* — Hicham Skhoun
(74) *Attorney, Agent, or Firm* — K&L Gates LLP (57) ABSTRACT

Methods and systems of encoding parent-child map tile relationships in a quad tree data structure are provided. A first bit string is generated, wherein the level and position of a node in the tree is transformed into a string containing values of the nodes in a parent-child relationship, in descending order of level, and a second bit string is generated that identifies and disambiguates the specific level in the quad tree of a reference node.

16 Claims, 6 Drawing Sheets

METHODS AND SYSTEMS FOR ENCODING PARENT-CHILD MAP TILE RELATIONSHIPS

BACKGROUND

Map users are demanding ever more powerful and personalized mapping applications. In addition, the volume of detailed, high-quality data available for use by mapping applications is constantly growing. These factors can drive the development of increasingly accurate, robust and granular mapping applications.

Such mapping applications can divide map data into numerous portions that can be arranged as tiles. A tile can represent a rectangular or square region on a map, although other shapes are possible. When organized in a hierarchical manner, map tiles can enable zooming. A way to enable interactive map features is by providing zoom levels, where the highest zoom level can correspond to a single map tile representing the image seen from the highest altitude from the ground, and the lowest zoom level can correspond to map tiles representing the images seen from the lowest altitude to the ground.

However, the sheer amount of raw map tile data upon which mapping applications rely is enormous and ever-expanding, imposing constraints on the efficiency and timely performance of base map loading and processing. Accordingly, there is a need for improved methods and systems for these important functions.

DETAILED DESCRIPTION

In the following description, reference is made to the accompanying drawings which illustrate several embodiments of the present invention. It is understood that other embodiments may be utilized and mechanical, compositional, structural, electrical and other operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure may overcome one or more of the aforementioned and other deficiencies experienced in conventional approaches to base map loading and processing. In particular, various approaches described herein enable encoding and enumerating parent-child map tile relationships leading to more efficient base map loading and processing.

Figure 2:
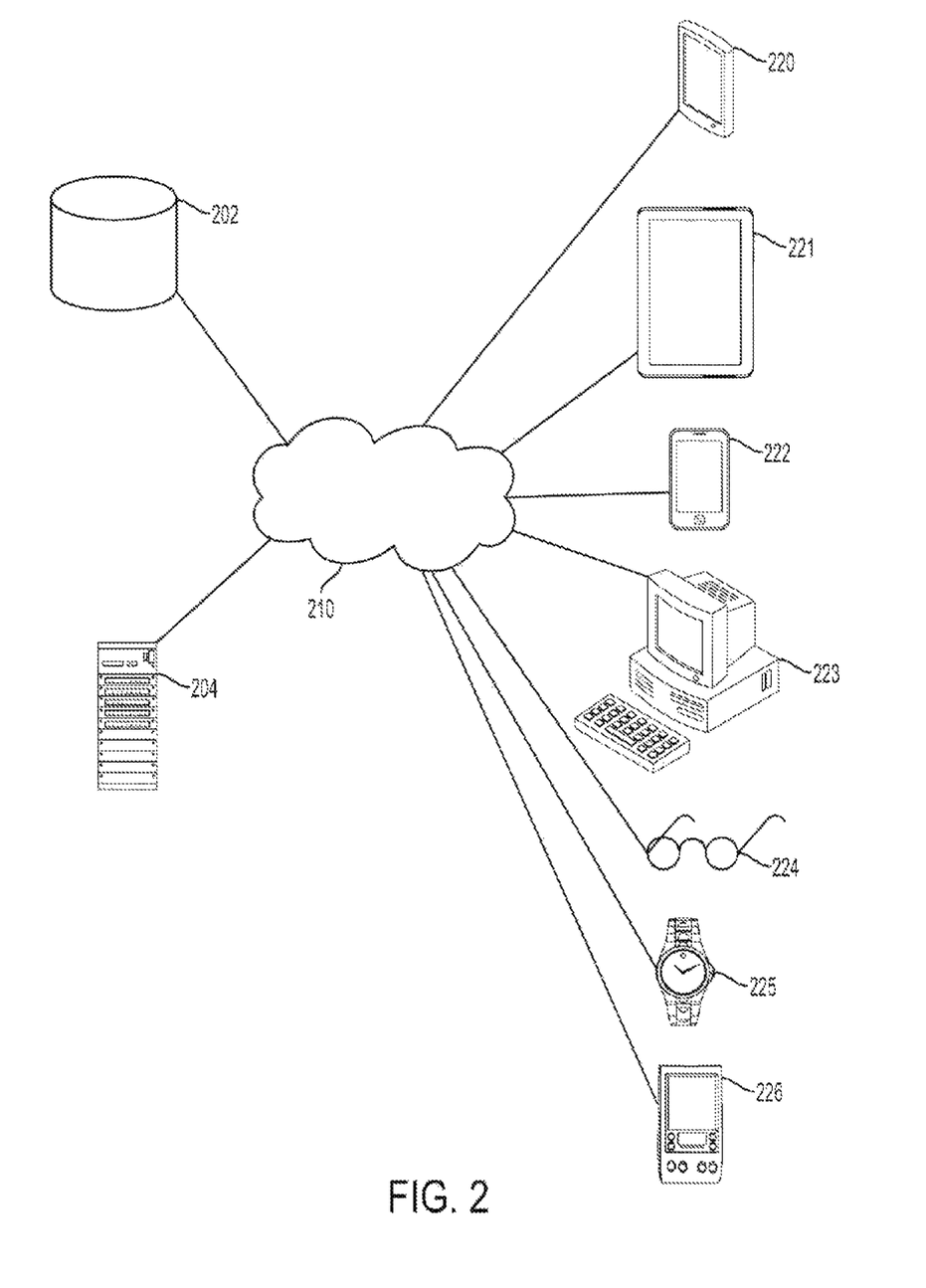
FIG. 2 illustrates an example computing environment in accordance with various embodiments.

FIG. 2 depicts an example computing environment in which various embodiments can be carried out. A database(s) 202 can be in communication, via a network 210, with a server 204. Database 202 can contain base map data. Server 204 is capable of loading and processing base map data obtained from database 202, and configure such data in information groupings, such as multiple map tiles. A client device in communication with server 204 through a network 210 can request map information. By way of non-limiting example, a client device can be an e-reader 220, a tablet 221, smart phone 222, personal computer 223, laptop computer or the like, smart glasses 224 or similar optical device, smart watch 225, or GPS device 226.

Server 204 may include at least one processor for executing instructions that can be stored in server 204, and may include memory functionality in or in operative communication with server 204. And, one of skill in the art will also understand that each of client devices 220-226, or another client device, would have at least one processor(s) and at least one memory(ies). Network 210 can include one or all of a wireless or wired network including the Internet, LANs, WANs, and so on, the foregoing in communication with one and another, and it will be readily appreciated that multiple architectures, designs and functionalities of the computing environment can work in accordance with various embodiments herein.

Thus, although an example computing environment is shown, various other configurations and architectures can be implemented. In addition, a client device capable of determining, processing, and receiving user input can be used in accordance with various embodiments discussed herein. It should be evident that any device with a suitable display that can show mapping information can be used in accord with various embodiments.

Mapping applications employ various approaches. One approach is to split map pieces into tiles. Each tile can be a region in the map. Shapes these tiles can take include rectangles and squares, although other shapes are possible. A single tile can represent a portion of an entire map. Splitting the map into tiles allows downloading the desired portion(s) of the map efficiently and display only that portion visible on a device(s).

In such an approach, a mechanism for storing and manipulating map data can be accomplished through a tree data structure. In a tree data structure, data is stored in nodes organized in a hierarchical manner. In an example tree data structure, there can be a "parent-child" relationship among a certain set of nodes. The ultimate "parent", which is conventionally rendered at the top of the tree, is specified. It is known as the root node. A root node can have one or more "child" nodes. A given child node can itself have one or more children, grandchildren, and so on. Thus, each node has one parent, and has one or more children. The exceptions are the root node which by definition has no parent, and a leaf node (or terminal node) which by definition has no child. A child is placed on a level directly below that of the parent. In this way, multiple levels of the tree are constructed, each level having a relationship to another level.

A tree data structure can be used for mapping applications. In one approach, a selected tile can be represented as a node on the tree. This enables multiple zoom levels. In other words, a map can be viewed at various zoom levels, i.e., various altitudes from the ground. In one embodiment, there are 18 zoom levels, numbered 0-17. Level 0 is the highest above the ground, level 17 closest. At each zoom level, the map can be split into tiles. The number of tiles on a level can be determined by the level number, with the total number of tiles increasing as the zoom level decreases.

In one type of tree data structure arrangement, each node has precisely four child nodes. This type of tree is known as a quad tree. Each node in a quad tree, thus, can be the parent node of four child nodes, wherein each child node is a quadrant of a two-dimensional space defining four regions on a given level of the tree.

Figure 3A:
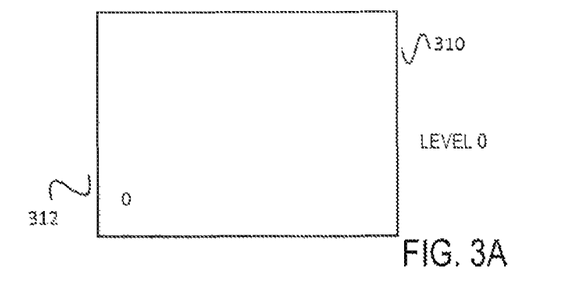
FIGS. 3A, 3B and 3C illustrate an example representation of sequential tile numbering.
Figure 3B:
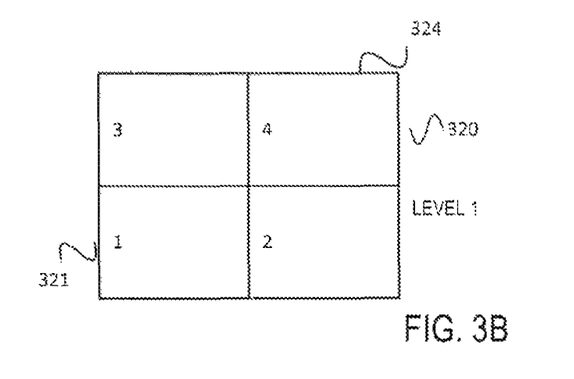
Figure 3C:
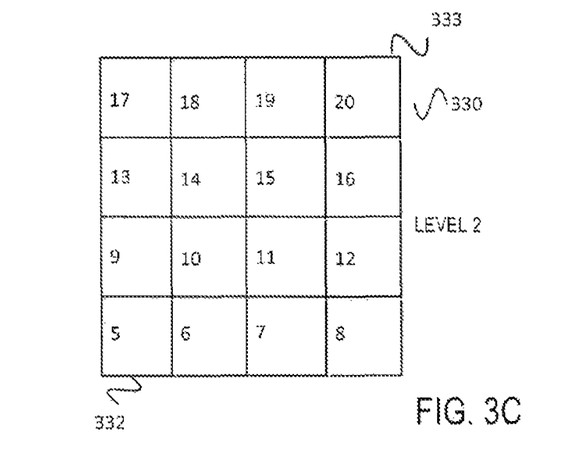

FIG. 3 shows a quad tree comprised of map tiles. It will be appreciated that the map tiles are nodes. A given level will have $4^n$ nodes, where n=level number. Level 0, which is the first level 310, and is the level farthest from the ground, can be considered the root node. Because it is at level 0, there will be one node 312. This is because $4^0=1$.

At level 1, seen at 320, which is the level immediately below level 0, there will be $4^1=4$ nodes. At level 2, seen at 330, there will be $4^2=16$ nodes. Levels 16 and 17 can be utilized as "virtual levels" that do not contain tiles, but rather can comprise representations of what a camera might see of the geographic features, scenery and the like at such level. Thus, levels 0-15 can be used to render a map. This results in 1,431,655,765 tiles in the map.

In one approach, each tile can be uniquely identified with a number assigned sequentially starting with the single node in top level 310. In this numbering scheme, the single tile at the top level 310 is numbered tile 0, as seen at 312. There are four tiles in level 1, and these tiles may be numbered 1, 2, 3 and 4. The numbering starts from left to right, starting, at level 1, with tile number 1 seen at bottom left 321 and running in consecutive integers, by row, to top right at tile number 4 seen at top right 324. There are sixteen tiles in level 2, which are given by 5, 6, 7, . . . 19, 20. Tile number 5 is seen at 332, and tile 20 is seen at 333. This arrangement continues for all levels until the top right tile of the lowest level is reached. In this way, a mapping application can use a quad tree with sequentially numbered tiles based upon hierarchically represented nodes to comprise and render zoomable regions.

It will be appreciated that each node contains mapping information related to such node. Such mapping information can comprise one or more objects. An object may be one of many items such as a road, lake, park, part of an ocean, etc. The objects associated with a level can be determined by the size of the object. The size of an object can be characterized by the maximum of length and breadth of the bounding box of the object. Where the node (i.e., tile) is a square, it follows that the size of the node is the length of its side. Based on the size of the object with respect to the size of nodes at various levels, a suitable level is identified in which to place the object. For an object to be placed in a certain level, an object-rendering parameter can be utilized. One such parameter holds that in order for an object to be rendered at a particular level, the size of the object can be between 0.75 times and 1.5 times the size of one of the nodes at that level. Added parameters of varying dimensions can be utilized.

In many cases, the object may extend across the boundaries between multiple nodes in a level. Nodes that "touch" or intersect the current object at that level are determined. The resulting nodes can be considered the intersecting nodes for the object.

For every intersecting node of an object, the parent node covering each of the node(s) in question is identified. The parent node of an intersecting node can be considered a blanketing node of an object.

To turn raw mapping data into meaningful information that can be processed as desired, a list of objects for a given node is determined. In other words, for a given node, the roads, lakes, parks, and other objects that fall within the node are obtained. To accomplish this, the blanketing and intersecting nodes are used.

To determine objects within map tiles, the following can be done. First, objects are found that intersect the current node's child nodes. This finds all objects considered smaller than the current node. Second, objects are found that intersect the current node's blanketing nodes, and an explicit intersection test is performed with the current node.

There is an alternate method of determining intersecting and blanketing nodes. In other words, there is an alternate method of finding a list of objects for a given node. This alternate method employs a different numbering scheme for nodes. Rather than numbering nodes sequentially from bottom left to top right within a level, and from top to bottom across levels, given a tile number, to find its children, the tile number can be encoded in the context of bit strings.

To encode tiles for a quad tree in one or more bit strings, the total amount of bits needed in a first bit string is determined. The first bit string can be referred to as the transformed node identifier bit string. This is because a given node address is transformed into a bit string. Ultimately, it will be desirable to locate a specific node on a specific level, i.e., provide a unique node address. This may be considered the reference node address. A reference node may be understood as a node with a unique address in the tree. In other words, a reference node is identified as being located not only on a specific level, but being at a specific position on that level relative to the position of other nodes. To obtain a reference node address, bit operations can be performed on a transformed node identifier bit string, and on a level identifier bit string, both individually and in conjunction with the other, as discussed below.

It will be appreciated that each individual node in an 18-level quad tree can be identified via a 36-bit address that can be represented in a bit string, though as discussed elsewhere an additional five bits can specify the disambiguated level number. The most significant bits (here the first two bits) represent the address of the single node at level 0, which can be given the value 00 (because there are no other nodes on that level). The number of bits in the transformed node identifier bit string can thus be determined.

Figure 4:
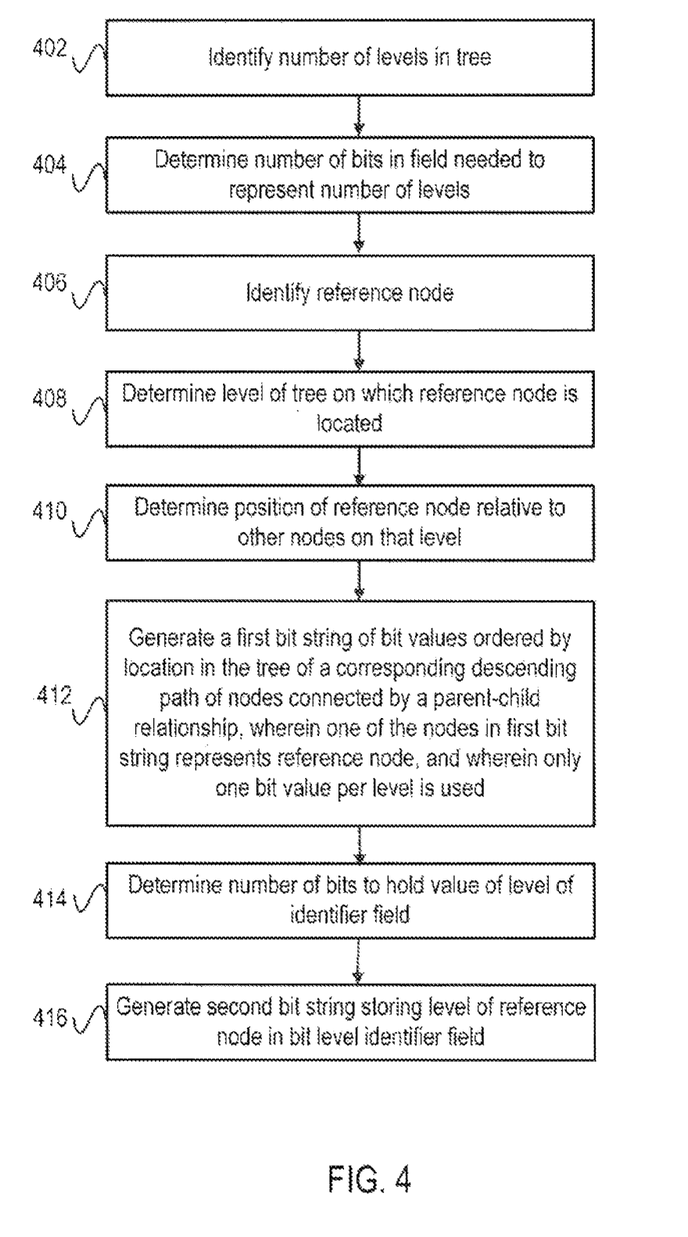
FIG. 4 is a flowchart representing a method in accordance with various embodiments.

As seen in FIG. 4, in an embodiment, then, in step 402 the number of levels, L, in a quad tree are identified. Given L levels in a quad tree, 2L bits can be used to represent the address of a node, as seen in step 404. In other words, where L=18 levels, the address of a node can be specified by L=36, i.e., 36 bits. This becomes evident by observing that, given four child nodes of every parent node, these four nodes can be represented by the values 00, 01, 10, and 11. In various embodiments using a quad tree, the bit values 00, 01, 10, 11 are each 2 bits long. It will be appreciated that the term "bit value" can refer to a block of bits in relation to each other, such as the bit pairs 00, 01, 10 or 11, or a block of three bits, or other amount of bit or bits.

Figure 5A:
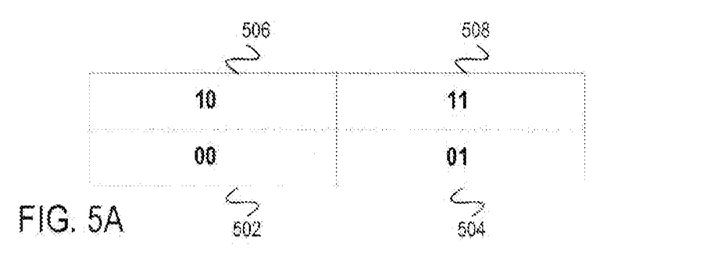
FIG. 5A represents an example configuration of node values corresponding to positions on a map tile level of a tree.

However, although the quantity of child nodes per parent (four) have been identified, an ordered grouping by which a node on the child level is positioned has not been specified FIG. 5A depicts the exact position of four nodes on a child level. Node 502, at bottom left, is numbered 00, because it is the first node of four on the level. Node 504, at bottom right, is numbered 01, because it is the second. Node 506, at top left, is numbered 10, because it is the third. Finally, node 508 is numbered 11, because it is the fourth of four nodes on the level. Another way to describe the specific node is to specify the quadrant into which it falls. The first quadrant is at top right (represented by value 11), second quadrant at top left (represented by value 10), third quadrant at bottom left (represented by value 00), and fourth quadrant at bottom right (represented by value 01). Because nodes 00, 01, 10 and 11 on the same level in a quad tree share a parent, they may be considered sibling nodes.

In step 406, a reference node is identified. A reference node is a node in the tree with a unique tile number, and thus a set of specific paths expressing its parent-child relationships. In step 408, the level of the reference node on the tree is identified. In step 410, the position of the reference node relative to nodes on the same level is identified. A two-bit value is designated corresponding to the position (e.g., quadrant) of the reference node relative to the other nodes.

Now a bit string can be generated to populate the bit fields in the 2L-bit bit string, as seen in step 412. In an embodiment, the most significant two bits (leftmost two bits) can always be represented by 00, because there is only one node at level 0. Each node in another level can take the four combinations 00, 01, 10 and 11, defining that node's position on the level. From most significant to least significant bits, in a quad tree an ordered sequence can be provided, which corresponds to the data structure's levels from highest (farthest from ground) to lowest (nearest), with successive bit values.

Figure 5B:
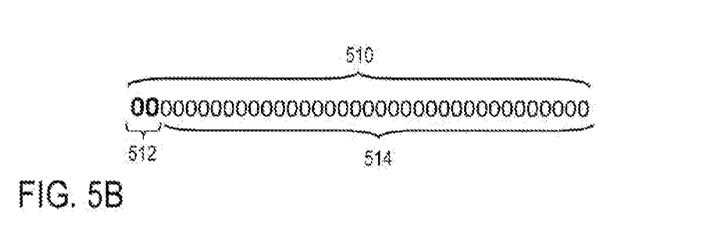
FIG. 5B represents a transformed node identifier with two significant bits highlighted, which can identify a first level of a tree.

FIG. 5B depicts a bit string 510 emphasizing the 36-bit address of the root node. This node is the tile highest from the ground. There is only one such node because it has no parent. As indicated before, this node is represented by 00, seen at 512. (As we will see, in various embodiments there are added ways of specifying and operating on bits to the right of a reference node.)

Figure 5C:
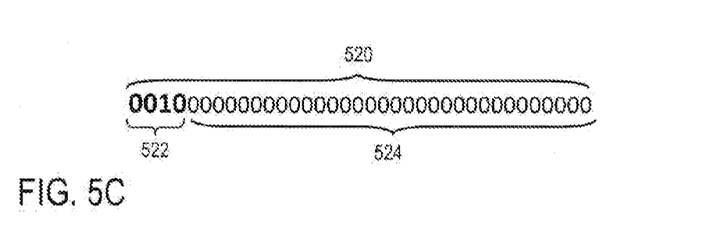
FIG. 5C represents a transformed node identifier with four significant bits highlighted, which can identify a second level of a tree.

FIG. 5C depicts a bit string 520 emphasizing a node that is located in the second quadrant of level 1. The first two bits—00—represent the first level (level 0), and the third and fourth bits—here, 10—represent the position of the node in question on the second level.

Remaining bits 524 can be given as zeroes (or ones). However, in adding zeroes or ones, potential address ambiguity can be created, as discussed later.

Figure 5D:
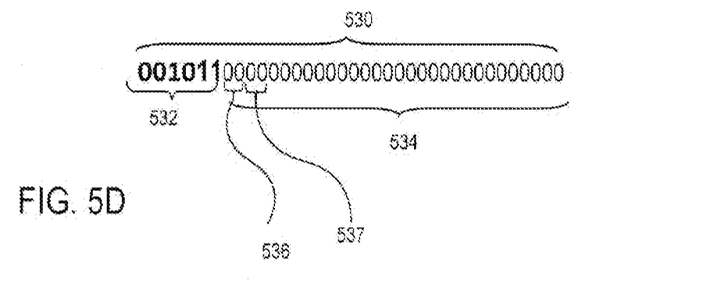
FIG. 5D represents a transformed node identifier with six significant bits highlighted, which can identify a third level of a tree.

FIG. 5D depicts a bit string 530 specifying the address of a node at level 2. Level 2 contains the 16 children of the four nodes in level 1. As can be seen based on the foregoing, the most significant six bits 532 specify the node in the first quadrant of level 2, wherein its parent node is the second quadrant of level 1. If the node defined by the six bits 532 is to be considered the reference node, remaining bits 534 can be given as zeroes in connection with generating step 412.

Accordingly, upon completion of the foregoing steps, a transformed node identifier bit string of 2L bits can be stored. Again, it will be appreciated that the bits in the bit string will be a series of bit values, and in an example embodiment the bits will be stored as a series of bit pairs (i.e., one or more of 00, 01, 10, 11).

Figures 1A, 1B:
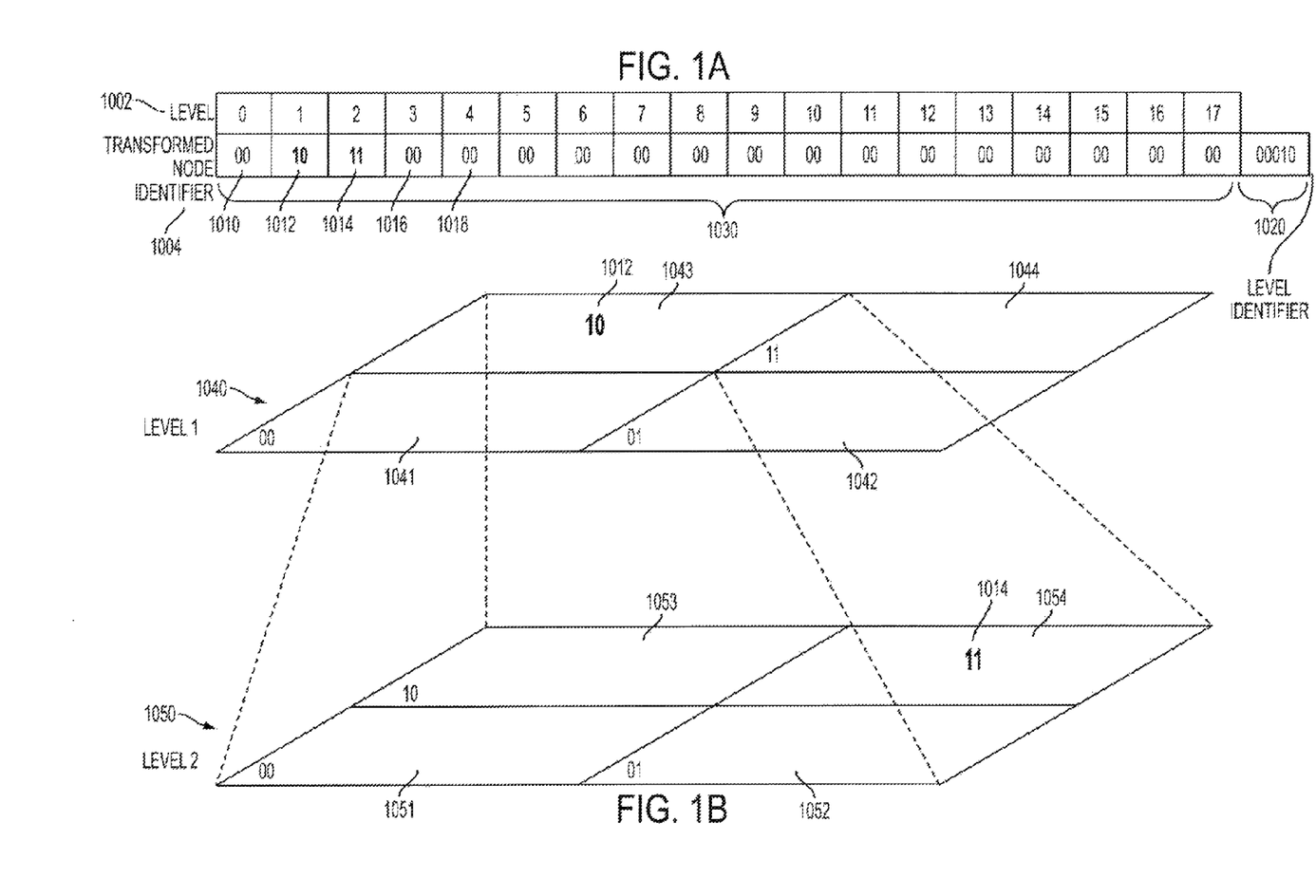
FIG. 1A illustrates a tabular example of tile enumeration in accordance with various embodiments.
FIG. 1B illustrates a graphical example of tile enumeration in accordance with various embodiments.

FIG. 1A represents a tabular version of the foregoing. The first row 1002 denotes the level number. The second row can depict a 36-bit string 1030 where, as discussed before, there are two bits per level. Here, then, as can be seen from FIG. 5D above, a node can be specified by the value provided in the 36-bit address 1030. This value, expressed as a 36-bit string, can be understood as a transformed node identifier.

FIG. 1B is a graphical depiction of a given node 1054 within the tree, which can be specified as follows. FIG. 1B shows node 1043 at the top left position of level 1 (seen at 1040). Node 1043 is one of the four children of the root node. Node 1043, itself, of course, has four children 1051, 1052, 1053, 1054, shown in FIG. 1C, on level 2 (as seen at 1050).

It can be seen that node 1054 can be represented by 36-bit string 1030 in FIG. 1A. The two most significant bits, 00 (seen at 1010) represent the node at level 0. The next two bits, 10 (seen at 1010) represent the node in the second quadrant of level 1. The next two bits, 11 (seen at 1014) represent the node in the first quadrant of the child nodes of node 1043.

With focus on node 1053, it can be appreciated that, by regarding the first bits of bit string 1030, a reference node is identified, such node being a unique node within the tree. This reference node is node 1054. However, there is potential ambiguity as discussed below.

FIG. 1A shows that the remaining bits of string 1030 "beneath" level 2 (i.e., levels 3-17) can be represented as zeroes. If each of these zeroes is given significance, then the child nodes in levels 3-15 are each at location 00, i.e., the third quadrant. (As mentioned before, levels 16 and 17 are virtual levels not represented by nodes.) This can lead to ambiguity. For example, consider FIG. 5D, which emphasizes the most significant six bits of the bit string 1030 that specifies a specific node within transformed node identifier 1004. Bits on the third level 536 are given as zeroes. So are bits on the fourth level 537. Thus, unless there is an emphasis provided to a given level represented in bit string 530, it cannot be specified with certainty the exact level of the reference node. Put another way, where trailing bits are stored as zeroes, this creates ambiguity whether it is, on the one hand, simply a convenient way of storing the transformed node identifier wherein the least significant bits may be stored as trailing zeroes or however desired or on the other hand, a specific node position (i.e., quadrant III) although it is impossible to specify which level such tile is on. In other words, where zeroes fill out bit fields from level 3 to level 17, it is possible that this represents a tile in the third quadrant of level 3, levels 3 and 4, or levels 3-17 inclusive. A similar ambiguity could arise if remaining bits are stored in an alternate sequence, such as ones.

As seen in FIG. 1A, the potential ambiguity is eliminated by generating a level identifier 1020. In other words, to specify the unique level on which a node is located on a quad tree, a second bit string of 5 bits that serves as a level identifier can be specified. This results in a bit string of 36+5=41 bits. The first 36 bits represent a transformed node identifier. The second 5 bits represent a unique level. It will be appreciated that the transformed node identifier and level identifier do not need to be concatenated or appended, physically or logically, during processing, so long as they are accessible in the form described.

As seen in step 414, the number of bits can be determined in the field in which level identifier 1020 can be stored, by employing the following equation, where L=number of levels in the tree:

$$2L+\text{ceil}(\log_2(L))=\text{Number of bits needed to identify a unique level}$$

To generalize, the equation can be seen as $NL+\text{ceil}(\log_2(L))$, where, for a quad tree, N=2, for an octree N=3, for a tree where each parent has 16 children N=4, and so on.

In an embodiment, there are 18 levels, so 2L=36. Further, the ceil function resolves a value x to the integer greater than or equal to x. Accordingly, $(\log_2(18))=4.1699250014$. Thus, ceil(4.1699250014)=5. This means that the 18 levels can be represented by 5 bits.

For example, level 0 (the first level, i.e., that highest from the ground) can be represented by 00000. Level 17 (level nearest the ground) can be represented by 10001. Accordingly, any specific level in an 18-level quad tree can be denoted with a string of 5 bits.

Thus, at step 416, a second bit string is generated storing the level of the reference node in the bit level identifier field. This specifies the exact level on which the reference node is located. Here it is clear that the value 00010 in level identifier 1020 specifies level 2.

A relationship can be designated between the first bit string and second bit string, wherein the second bit string designates a reference node address in first bit string. This associates the two bit strings with each other. Because the 41-bit string—composed of bit string 1030 and bit string 1020—identifies a specific node of a specific level, it is seen now that the 41-bit string uniquely identifies a reference node. In doing so, the 41-bit string disambiguates values in the transformed node identifier such as trailing zeroes. It will be appreciated that physical or logical concatenation of bits in the strings is not required so long as the bit strings are made available for further operations consistent with the disclosures herein. However, in an embodiment such concatenation (or appending, or joining or other relationship or operation as may be suitable given the software or hardware environment) may be performed. In an embodiment, the least significant bits of the first string are associated with the most significant bits of the second bit string.

It will also be understood that the 41-bit string disambiguates the transformed node identifier with respect to not just trailing zeroes of the reference node or other descendants of the reference node, but bits to the left of the reference node which may be considered ancestors of the reference node. A descendant node can be considered the path or paths of nodes comprised of a child and that child's children, down to and including the leaf level. An ancestor node can be considered the path of node or nodes comprised of a parent and that parent's parents, up to and including the root level. Accordingly, the 5-bit level identifier, when considered in conjunction with the 36-bit transformed node identifier, specifies one and one only node, which is the reference node.

Figure 6A:
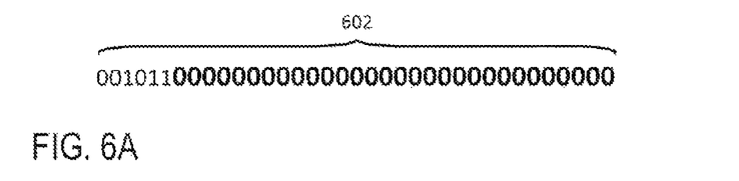
FIG. 6A represents a value defining a parent-child path within a tree, representing one bound of a range.
Figure 6B:
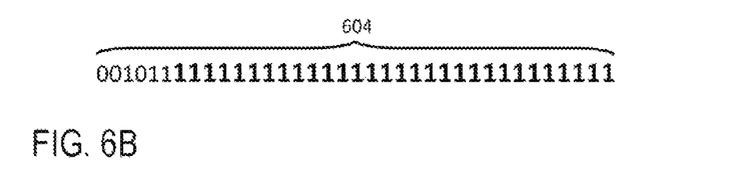
FIG. 6B represents a value defining a second parent-child path within a tree, representing another bound of the range demarcated in FIG. 6A.
Figure 6C:
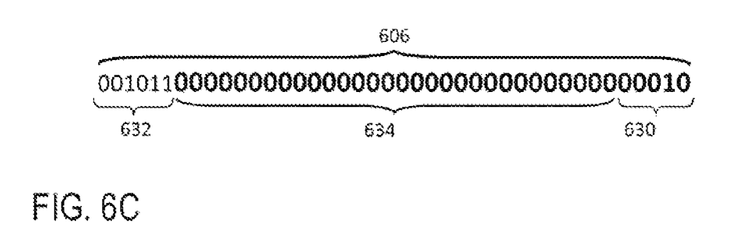
FIG. 6C is another technique to represent a bound of a range demarcated in FIG. 6A, across levels.
Figure 6D:
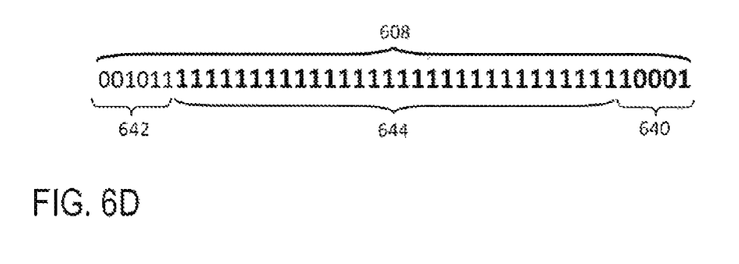
FIG. 6D is another technique to represent a bound of a range demarcated in FIG. 6B, across levels.

Now ranges are discussed. As mentioned above, less significant bits can be represented by zeroes, as seen in FIG. 6A. However, a range can be defined by the endpoints given by FIGS. 6A and 6B. Each and every node of each level of the tree from levels 2-17 can be represented within the range of the 36-bit values therein. The child nodes of level 2 are within this range. Adding five-bit level identifier 1020, it is seen that the range of child nodes for bit string 1030 are seen in FIG. 6C and FIG. 6D. In FIG. 6C, the five-bit level identifier 630, which here indicates the value of 2, is seen at the right of the string 606. In FIG. 6D, the five-bit level identifier 640, which here indicates the value of 17, is seen at the right of string 608.

An added way to understand the nodes expressed within a range is within the parent-child context. Nodes below a reference node that trace parentage to the reference node can be considered descendants of the reference node. The range of descendants for a tile whose most significant bits are 001011, seen at 632, are within the range of values defined by, on the one hand, bit string 632 appended to (or otherwise associated with) bit string 634, and on the other hand bit string 642 appended to (or otherwise associated with) with bit string 644.

Once a reference node address is determined, the 36-bit reference node identifier and 5-bit level identifier can be used to determine that node's parent node via a simple bit operation. This is because the 36-bit reference node contains the same bit sequence as its parent node, so the more significant bits can be masked for higher levels. This can be used in queries similar to how intersecting nodes can be evaluated and used.

Further, it can be considered that, seen more broadly, the reference node establishes a reference point. This reference point can refer to a reference node that is on, or comprises an endpoint of, one or more paths through the data structure. Or, a reference point can be associated with a node that is not the reference node. Indeed, a reference point can be established that is associated with multiple nodes. Using bit operations, the reference point can be used to determine at least one parent of the reference point, which may be considered a parent path. In addition, the reference point can be used to determine at least one child of the reference point, which may be considered a child path. It will be evident that various reference points can be added or deleted as suitable. Reference points can be changed dynamically during processing depending on the results desired. Multiple reference points can exist simultaneously. This can be one technique for determining a range. In context then, the ability to enumerate a parent-child relationship among nodes in accordance with various embodiments enables powerful, efficient and clear techniques to obtain multiple functional objectives.

In addition, it will be appreciated that determining a list of objects associated with a parent node and child node can be performed in various embodiments. In an embodiment, two portions of a bit string are identified. The first portion can comprise a series of bits that includes a parent node. The second portion can include a series of bits which, placed to the right of the bit value of locating parent node, can be set to zeroes. When associated with the first portion, the second portion defines one bound of a range of child nodes of the parent node. The second portion can be transformed from zeroes to ones, defining, when associated with the parent node, a second bound of a range of child nodes of the parent node. As a result, the child nodes of the parent node can be found within the range therein. Objects that fall wholly or partially within the child nodes can be identified by an example technique such as that described above, where, in an example embodiment, for a substantially square node of a level, an object can be located within that level where the object is greater than 0.75 times, and less than 1.5 times, the size of such substantially square node. Once objects associated with the child nodes have been found thereby, such objects can be associated with the parent node, comprising a list of objects associated with the parent node.

In an embodiment, the parent-child relationships can be determined at or after loading of raw mapping data into server 204. Thus, the parent-child relationships can be pre-generated or pre-cached prior to further processing by server 204, or other device. Such operations can proceed on a batch basis.

Accordingly, with the above methodology, a list of objects associated with a given node can efficiently be found, because the reference node's child nodes and its parent nodes have been efficiently identified.

In an embodiment, the data structure given is a quad tree. However, one of skill in the art will recognize that the methods disclosed herein can be applied to an octree, i.e., a tree where each parent has exactly eight child nodes. In an octree, instead of representing node position by two-bit fields (bit pairs 00, 01, 10 and 11), the values will be stored in three-bit fields (000, 001, 010, 011, 100, 101, 110, 111). In addition, the number of bits comprising the transformed node identifier will be 3L, and not, as with a quad tree, 2L.

While the invention has been described in terms of particular embodiments and illustrative figures, those of ordinary skill in the art will recognize that the invention is not limited to the embodiments or figures described.

Some portions of the detailed description which follows are presented in terms of procedures, steps, logic blocks, processing other symbolic representations of operations on data bits that can be performed on computer memory. Each step may be performed by hardware, software, firmware, or combinations thereof.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A computer-implemented method of enumerating map tile nodes arranged in a quad tree data structure, the method comprising:
    identifying a number of levels in the quad tree data structure comprising a plurality of tree levels, the quad tree data structure representing a road map for use in a mapping application, the road map having a plurality of zoom levels, wherein a first level of the quad tree data structure corresponds to a first zoom level of the plurality of zoom levels;
    determining a number of bits for a first bit string, the number of bits being a function of the number of levels in the tree;
    identifying a reference node to be enumerated, the reference node representing a portion of the road map located on the first level of the tree and having a position relative to other nodes on that level;
    generating the first bit string comprising a series of bit values, the bit values ordered by a location in the tree of a corresponding descending path of nodes connected by a parent-child relationship, wherein one of the bit values is a reference node value representing the reference node's position on the first level relative to that of the other nodes on the first level, wherein the position of the reference node value in the first bit string represents the first level of the reference node;
    generating a second bit string specifying the first level of the reference node;
    utilizing the first bit string and the second bit string to identify an object on a different zoom level than the reference node;
    generating a third bit string by copying the first bit string, transforming any bits to the right of the reference node value to zeroes, and associating the generated second bit string with the third bit string, enumerating an upper bound;
    generating a fourth bit string, by copying the first bit string and transforming any bits to the right of the reference node value to ones, and associating the generated fourth bit string with a fifth bit string that represents the lowest level in the tree, enumerating a lower bound; and
    identifying a range of nodes bounded by the upper bound and the lower bound, wherein nodes in the range of nodes represent the children of the reference node.

2. A computer-implemented method of specifying relationships among nodes arranged in a quad tree data structure comprising a plurality of tree levels, the quad tree data structure representing a road map having a plurality of zoom levels, the method comprising: generating a first bit string that encodes a reference node to be enumerated, wherein the first bit string includes a reference node value, wherein the reference node value represents a first position on the reference node on a first level of the plurality of zoom levels relative to that of the other nodes on the first level, wherein a second position of the reference node value in the first bit string represents the first level of the reference node;
    generating a second bit string representing a value that specifies the first level; utilizing the first bit string and the second bit string to identify an object on a different zoom level than the reference node;
    generating a third bit string by copying the first bit string, transforming any bits to the right of the reference node value to zeroes, and associating the generated second bit string with the third bit string, enumerating an upper bound;
    generating a fourth bit string, by copying the first bit string and transforming any bits to the right of the reference node value to ones, and associating the generated fourth bit string with a fifth bit string that represents the lowest level in the tree, enumerating a lower bound; and
    identifying a range of nodes bounded by the upper bound and the lower bound, wherein nodes in the range of nodes represent children of the reference node.

3. The method of claim 2, wherein the second bit string disambiguates the first level of the reference node in the first bit string from a second level of an additional node, in the event a fifth bit string encoding the second level of the additional node is equal to the first bit string encoding the first level of the reference node.

4. The method of claim 2, further comprising identifying the parent of the reference node by masking the bit value of the reference node in the first bit string.

5. The method of claim 2, wherein the first bit string encodes a series of levels in the tree in descending order from a root node.

6. The method of claim 2, wherein the first bit string encodes a series of levels in the tree in descending order from the reference node.

7. The method of claim 2, wherein a node's position in a level is represented as a two-bit value.

8. The method of claim 2, wherein the number of bits in the first bit string is a function of the amount of levels.

9. The method of claim 2, wherein the number of bits in the second bit string resolves to the following, where L=number of levels:

$$\mathrm{ceil}(\log_2(L)).$$

10. The method of claim 2, wherein the sum of the number of bits of the first bit string combined with the second bit string resolves to the following, where L=number of levels:

$$2L+\mathrm{ceil}(\log_2(L)).$$

11. The method of claim 2, wherein the first bit string is associated with the second bit string, forming a combined bit string.

12. The method of claim 2, wherein a reference point associated with a node is established by selecting a specific node upon which bit operations connected therewith can be performed.

13. The method of claim 12, wherein at least one path to at least one added node in the data structure can be determined.

14. The method of claim 12, wherein an ascending path comprising at least one parent node can be enumerated.

15. The method of claim 12, wherein at least one descending path comprising at least one child node can be enumerated.

16. A system for specifying relationships among nodes arranged in a quad tree data structure comprising a plurality of tree levels, the quad tree data structure representing a road map having a plurality of zoom levels, the system comprising:
- at least one processor, in communication with at least one operatively associated non-transitory memory, the at least one processor programmed to:
  - generate a first bit string that encodes a reference node to be enumerated, wherein the first bit string includes a reference node value, wherein the reference node value represents a first position of the reference node on a first level of the plurality of zoom levels relative to that of the other nodes on the first level, wherein a second position of the reference node value in the first bit string represents the first level of the reference node
  - generate a second bit string representing a value that specifies the first level;
  - utilize the first bit string and the second bit string to identify an object on a different zoom level than the reference node;
  - generate a first copy of the first bit string and transform any bits to the right of the reference node value to zeroes in the first copy, to generate a third bit string;
  - associate the generated second bit string with the third bit string to enumerate an upper bound;
  - generate a second copy of the first bit string and transform any bits to the right of the reference node value to ones in the second copy, to generate a fourth bit string:
  - associate the generated fourth bit string with a fifth bit string that represents the lowest level in the tree to enumerate a lower bound; and
  - identify a range of nodes bounded by the upper bound and the lower bound, wherein nodes in the range of nodes represent children of the reference node.

* * * * *

UNITED STATES PATENT AND TRADEMARK OFFICE
CERTIFICATE OF CORRECTION

| | |
|---|---|
| PATENT NO. | : 9,396,249 B1 |
| APPLICATION NO. | : 13/921837 |
| DATED | : July 19, 2016 |
| INVENTOR(S) | : Rajkumar Balasubramanian |

It is certified that error appears in the above-identified patent and that said Letters Patent is hereby corrected as shown below:

In the claims,

Column 10, line 19, in claim 2, replace "on" with --of--.

Signed and Sealed this
Twenty-third Day of August, 2016

Michelle K. Lee
*Director of the United States Patent and Trademark Office*